United States Patent [19]
Caldwell

[11] 4,401,338
[45] Aug. 30, 1983

[54] STREAMLINING DEVICE FOR VEHICLES

[75] Inventor: Kenneth Caldwell, Bridport, England

[73] Assignee: Fibrelock Fabrics Limited, England

[21] Appl. No.: 207,186

[22] Filed: Nov. 14, 1980

[30]　　Foreign Application Priority Data

Nov. 16, 1979 [GB] United Kingdom ............... 79/39672

[51] Int. Cl.³ ............................................ B62D 35/00
[52] U.S. Cl. ...................................................... 296/1 S
[58] Field of Search ........................................ 296/1 S

[56]　　References Cited

U.S. PATENT DOCUMENTS

| 3,834,752 | 9/1974 | Cook et al. | 296/1 S |
| 4,030,779 | 6/1977 | Johnson | 296/1 S |
| 4,036,519 | 7/1977 | Servais et al. | 296/1 S |

Primary Examiner—Robert R. Song
Attorney, Agent, or Firm—Natter & Natter

[57] ABSTRACT

There is disclosed a streamlining device for vehicles and trailers. The device includes at least one air-tight, inflatable member; means to permit inflation or deflation of said member and means for mounting said member on a vehicle or trailer. The member is so shaped that, when inflated, the device improves the aerodynamic characteristics of the vehicle or trailer.

9 Claims, 9 Drawing Figures

STREAMLINING DEVICE FOR VEHICLES

The present invention relates to a streamlining device for vehicles, more particularly commercial vehicles, and trailers, including caravans. The device of the present invention aims to produce fuel economy in such vehicles.

It is well known that commercial vehicles, particularly by virtue of having a substantially flat front portion, are very wasteful of fuel, particularly when running at relatively high speed. Due to the shape of such vehicles, a substantial wind resistance builds up as the speed of the vehicle increases. A so-called "drag effect" is produced at the rear end of the vehicle as well.

It is an object of the present invention to provide a device, or a plurality of devices, which are designed to provide a streamlined profile to the flat surface at the front of the vehicle, and also in certain embodiments, to streamline the back end, thereby reducing drag and fuel usage.

Rigid or fixed streamlining devices are known and it is an object of the present invention to provide a streamlining device which is used when such rigid or fixed streamlining devices are not practical.

According to the present invention there is provided astreamlining device for vehicles and trailers comprising at least one air-tight inflatable member, means to permit inflation or deflation of said member and means for mounting said member on a vehicle or trailer, said member being so shaped that, when inflated, the device improves the aerodynamic characteristics of the vehicle or trailer.

In a preferred embodiment of the present invention, the inflatable member or members is or are located within an outer container or bag. Such container or bag may be formed of any suitable flexible sheet material.

When a plurality of air-tight, inflatable members are utilised, they preferably have differing inflation pressures.

It is to be understood that the device of the present invention can be used on all types of commercial vehicles, the location of the device, or a plurality of such devices, depending upon the particular vehicle concerned.

It is envisaged that the device of the present invention could also be used to improve the aerodynamic characteristics of any structure having a substantially flat face. For instance, the device of the present invention could be used on oil rigs in order to cut down the wind drag effect on square structures of such rigs.

The invention will now be described in relation to the use of the device, or a plurality of such devices, with commercial vehicles, although it is to be understood that the invention is not limited thereto.

Each device according to the present invention is preferably fabricated from a plastics or rubberised sheet material, and may, for instance, be similar in construction to the material used in the construction of inflatable rubber/plastics boats and dinghies. The device will be provided with suitable valve means to permit inflation or deflation thereof.

In a preferred embodiment the device may be constructed with an outer bag of any flexible sheet material and an inner air-tight inflatable member or with a plurality of inner inflatable members having differing inflation pressures. When inflated, such device will assume a substantially streamlined bulbous shape, such shape improving the aerodynamic characteristics of the vehicle. In an alternative arrangement, the device can be moulded in the form of a streamlined bulbous section and such shape is retained by introducing air or a like gas into the device.

In a further embodiment of the present invention, and in order to maintain the inflated shape, instead of producing such inflation by introduction of a gas, material which will retain the shape of the device when inflated, such as granulated polystyrene chips or similar material is introduced into the device.

The device of the present invention may be located on the roof of the cab or on the front surface of the van body, depending upon the nature of the vehicle. Furthermore, it is also possible to locate one or more devices at the rear of such vehicles.

The method of inflating the inflatable devices in accordance with the present invention is preferably by use of a reversible air pump or alternatively by utilising the existing air supply of the vehicle, and by manipulating control valve gear located in the cab or in some other suitable place.

The device of the present invention provides the advantage that same is both inflatable and deflatable as well as being demountable when not in use or when the provision of same would cause problems in the loading or unloading of the vehicle.

The device of the present invention has the advantage that same can be used with a variable height load, such as the case of a flat bed wagon carrying pallets. Clearly, the height of the load will depend upon the number of pallets present. The device of the invention can be adjusted to a particular height by using an adjustable skirt or one or more straps and winch arrangement whereby the driver of the vehicle is able to adjust the location of the device to suit the load. Once in an appropriate positon, then the device is inflated to a predetermined pressure. In the case of a so-called "fixed-body" van, the device of the present invention may be mounted on the roof of the cab or on the front face of the body, or both. In the case of a pantechnicon vehicle, the device is generally provided on the front face of the vehicle and is usually provided with internal straps to prevent sag of the device when deflated. Such arrangement would be inflatable within the cab by the driver when the vehicle went on the open road or on a motorway and deflated whilst moving about town, the inflatable device being totally evacuated, for example, by the pump being reversed.

Similar arrangements could be provided at the rear end of the vehicle, but to comply with the law, an extending bumper with lights would be needed to cover the extension produced by the inflatable device being attached to the rear of the vehicle. In such arrangement, the device could be attached over the whole width of the rear of the van body and again provided with internal straps in order to prevent sag when the device was deflated. In an alternative embodiment, two devices can be used each being fixed to the door of the rear of the vehicle.

In the case of an articulated vehicle, the shape of the device, when inflated, would be slightly different to that of the previously described devices having regard to the nature of the articulated vehicle.

In order to further illustrate the present invention, reference is made to the accompanying drawings wherein various commercial vehicles and trailers including caravans are illustrated and the manner of attachment of the inflatable device in accordance with the present invention is shown. Such drawings, show several embodiments depending upon whether a "fixed body" pantechnicon or articulated vehicle is concerned. Clearly it can be seen that the device of the present invention can be so shaped, when inflated, to comply with any particular flat surface size.

Figure 1:
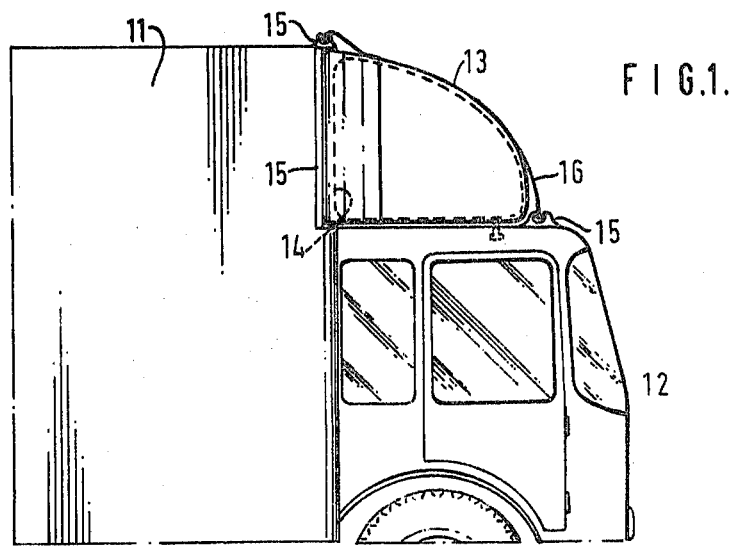
FIG. 1 is a side elevational view of a portion of a vehicle having a so-called 'van-type' body with streamlining device of the invention attached thereto.

As illustrated in FIG. 1, a vehicle comprises a van body 11 and a cab 12. A streamlining device in accordance with the invention comprises an outer bag 13 formed of flexible sheet material and an inner inflatable member 14 formed from a plastics or rubberised sheet material, and shown in the inflated condition by broken lines. Tracks 15 are fitted across the front of the cab top, across the top and down both sides of the van body 11, to secure the device to the vehicle. The track 15 fitted across the front of the cab top may be curved and a front skirt 16 is sewn or fixed to the outer bag 13 at one end and at the other end is clipped into the track 15 to prevent air gaps. The bag 13 is fixed to the other three sides in a normal manner. The inner member 14 is provided with suitable valve means to enable same to be inflated or deflated, possibly utilising the air supply of the vehicle, such inflation or deflation being effected within the cab 12 by the driver.

Figure 2:
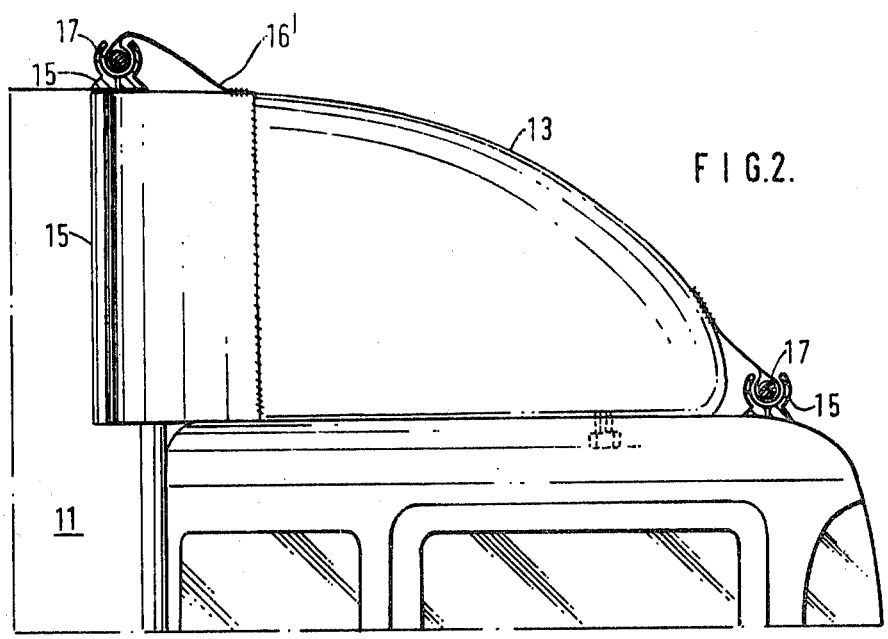
FIG. 2 is an enlarged side elevational view of the arrangement of FIG. 1, showing attachment of the streamlining device to the van body.

FIG. 2 is an enlarged side elevational view of the arrangement of FIG. 1, and shows in detail the attachment of the bag 13 to the top of the van body 11. As illustrated, the top skirt 16' is sewn or fixed at one end to the bag 13 and at the other end is provided with a rope 17, sewn or fixed to the skirt 16', which rope 17 is clipped into aluminium extrusion track 15.

The bag 13 is desirably made smaller than the front of the vehicle and will bulge at the sides to give smooth flow of air at the sides and top of the vehicle. Such arrangement also gives universal size fixing.

Figure 3:
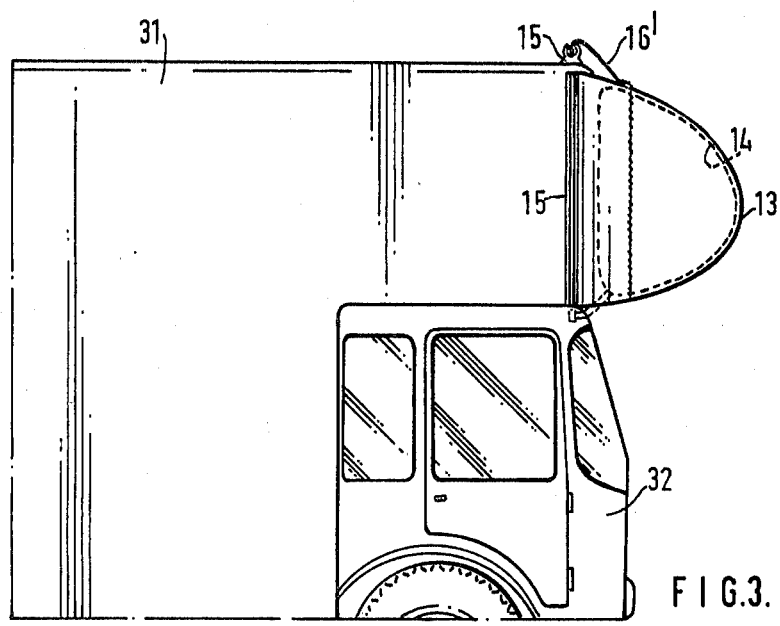
FIG. 3 is a side elevational view of a streamlining device of the invention located on a pantechnicon vehicle.

FIG. 3 shows the streamlining device of the invention provided on the front face of a pantechnicon vehicle 31. The device comprises outer bag 13 and inflatable member 14, shown in the inflated condition by broken lines. The top skirt 16', which extends right around the bag 13 is fixed to the top and sides of the front face of the pantechnicon vehicle 31 by being clipped into tracks 15, in a similar manner as illustrated in FIG. 2. The streamlining device is generally provided with internal straps (not shown) to prevent sag of the device when deflated. The member 14 has suitable valve means to enable same to be inflated or deflated. Inflation of the member 14 is preferably effected from within the cab 32 when going onto the open road or on a motorway and deflation is effected when the pantechnicon is driving about town.

Figure 4:
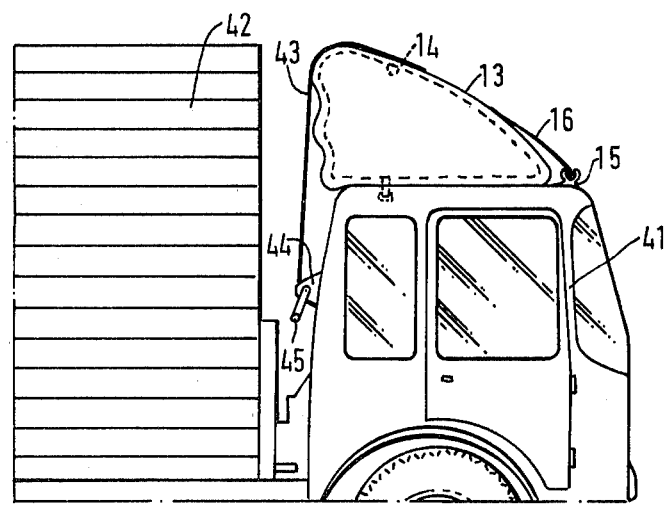
FIG. 4 is a side elevational view of a streamlining device of the invention for use with flat deck-variable load heights.

FIG. 4 shows a streamlining device in accordance with the invention in use on a vehicle having a variable height load, for example a flat bed wagon carrying pallets, wherein the height of the load depends upon the number of pallets present. As illustrated, the streamlining device is located on the cab 41 of a vehicle having adjustable height saw pallets 42. The height of the streamlining device, formed of outer bag 13 and inflatable member 14, can be adjusted to a particular height by using an adjustable skirt 43 and winch 44 having a ratchet handle 45, whereby the driver of the vehicle is able to adjust the location of the device to suit the load. Once in an appropriate position, the device is inflated to a predetermined pressure.

Figure 5:
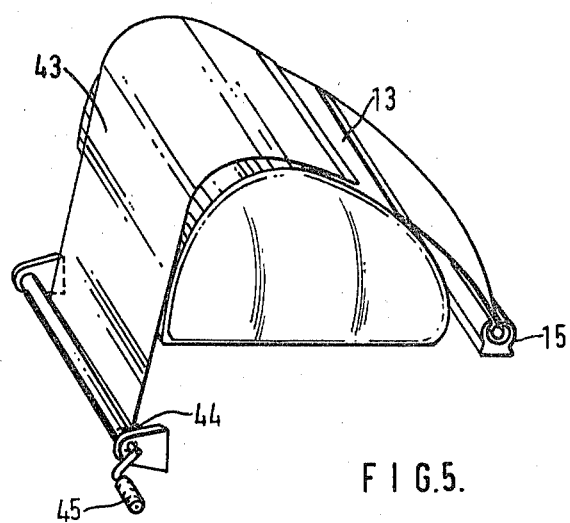
FIG. 5 is an enlarged view of the streamlining device of FIG. 4.

FIG. 5 shows the streamlining device arrangement of FIG. 4 in more detail. The front skirt 16 is fixed or sewn at one end to the outer bag 13 and at its other end is clipped into track 15 located on top of the cab 41 in a similar manner as shown in FIG. 2. The adjustable top skirt 43 is fixed or sewn at one end to the top region of the bag 13 and at its other end is wound around the winch 44. By operation of the ratchet handle 45, the skirt 43 can be wound down to reduce the height as required and the member 14 is then inflated, in a similar manner as previously described. For a journey when the vehicle is carrying no pallets, the streamlining device is deflated and wound down tight so that it lays substantially flat on the top surface of the cab 41.

Figure 6:
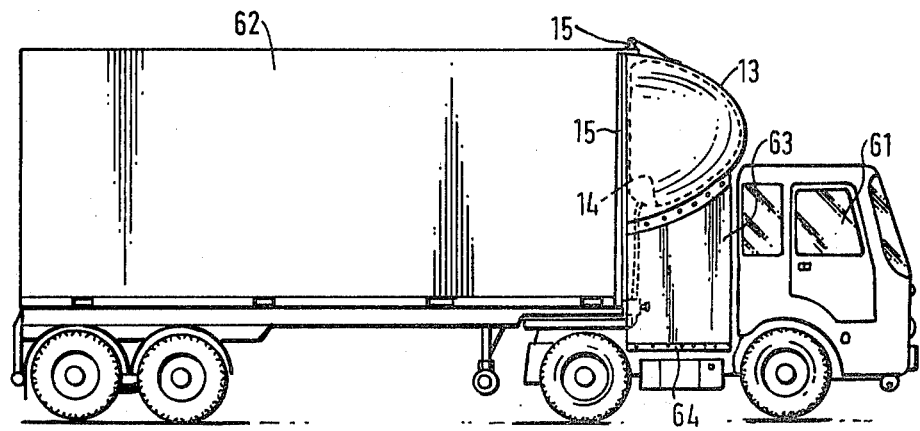
FIG. 6 is a side elevational view of a streamlining device of the invention for use with an articulated vehicle.

FIG. 6 shows the streamlining device utilised on an articulated lorry and being located on the front face of the trailer 62. The outer bag 13 is fixed by means of a skirt to the top and sides of the trailer 62 by means of tracks 15, in a similar manner as described in relation to FIG. 1. A lower edge skirt 63 is fixed or sewn to the lower edge of the bag 13 at one end and at the other end is laced or fixed to a suitable bar or points on the chassis 64. The lower edge skirt, which can be straight or curved, fills the air gap between the cab 61 and the trailer 62. The inflation of member 14 is effected in similar manner as previously described.

Figure 7:
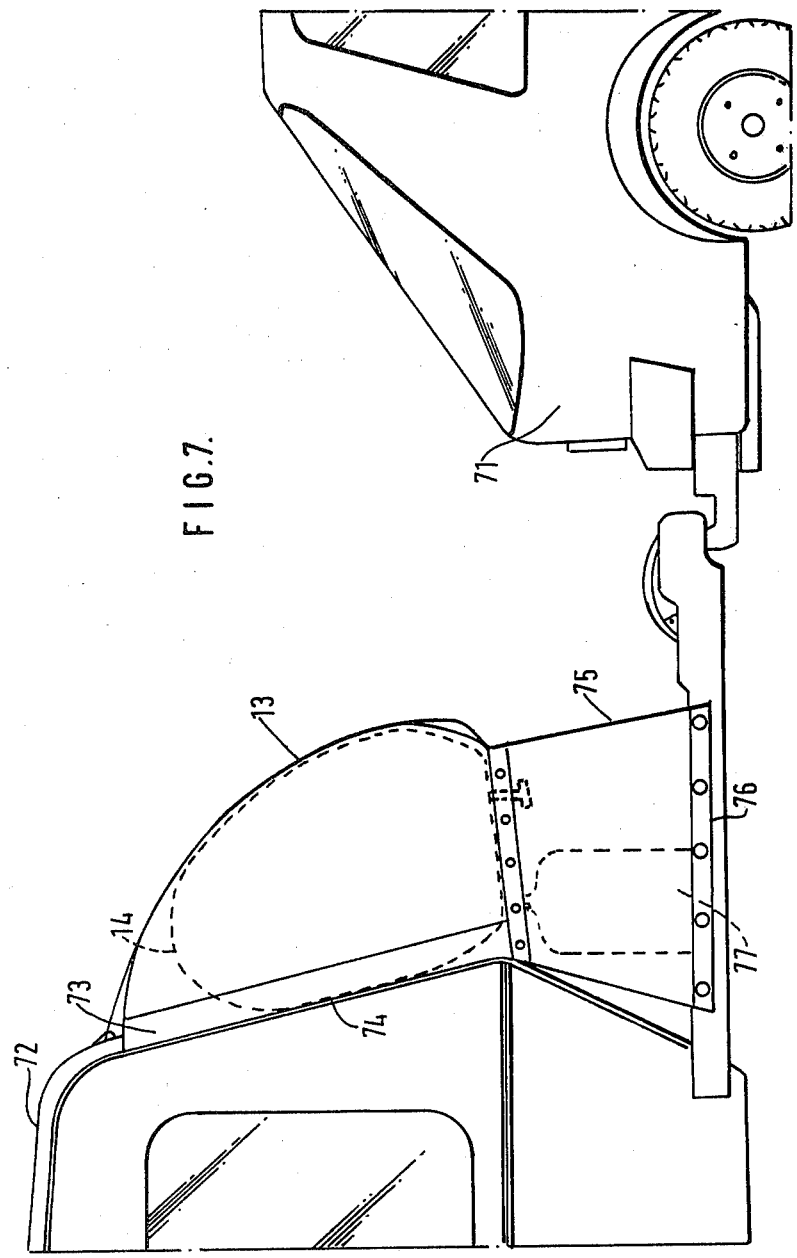
FIG. 7 is a side elevational view of a streamlining device of the invention attached to a trailer caravan.

FIG. 7 shows the streamlining device utilised on a trailer caravan 72. The outer bag 13 is attached to the caravan by utilising a top skirt 73 which is fixed or sewn to the bag 13 at one end, and at its other end is clipped in awning channels 74 on both sides of the caravan. A lower edge skirt 75 is fixed or sewn to the lower edge of the bag 13 at one end and at the other end is laced down or fixed to suitable points on the chassis or draw bar 76. The skirt 75 fills the air gap between the car 71 and the caravan 72. An air cylinder 77 for inflating member 14 may be located on the bar 76.

Figure 8:
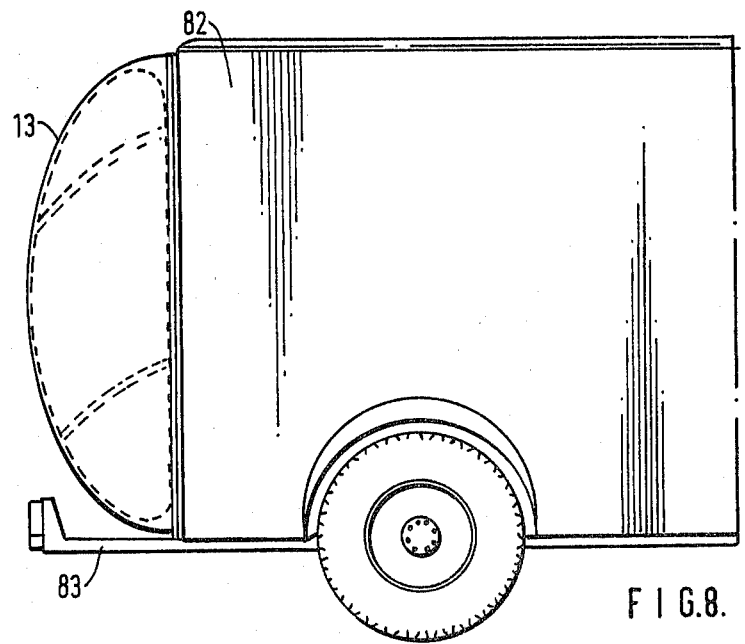
FIGS. 8 and 9 are schematic plan views of two embodiments of the streamlining device of the invention attached to the rear end of a vehicle.
Figure 9:
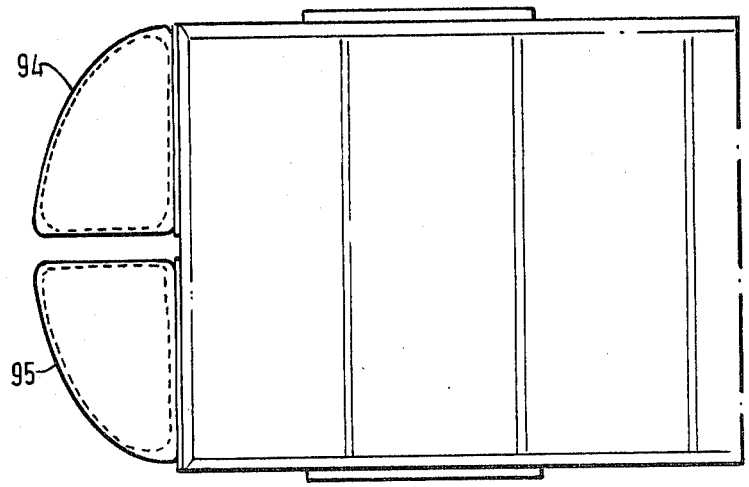

FIGS. 8 and 9 schematically show, in plan, two embodiments of a streamlining device in accordance with the invention located at the rear end of a trailer. In the embodiment of FIG. 8 the outer bag 13 is attached to the rear end of a trailer 82. The device would be attached to the top, sides and bottom of the rear end of the trailer 82 by utilisation of tracks as described in detail in FIG. 1. Internal straps (not shown) would also be provided to prevent sag of the device when deflated. To comply with the law, an extending bumper 83 with lights is necessary to cover the extension produced by the inflatable device.

In the alternative embodiment of FIG. 9 two inflatable devices 94 and 95 are provided, each being fixed to the door of the rear of the vehicle. The inflation of the inflatable member is effected in a similar manner as previously described.

It can be seen that the device of the present invention, due to same being inflatable/deflatable and mountable/demountable, can be used with a vehicle which has different trailers attached thereto for different journeys. Furthermore, it is possible to adjust the height and location of the device of the present invention as compared with known fixed arrangements.

A further embodiment of the invention will now be described, which has particular application to flat bed wagons which normally transport material supported on pallets. Taking, for example, a flat bed wagon which is carrying salt or like material, two pallets high, then there is need for covering of the load and securing such covering arrangement by the use of ropes or similar securing means. It can be seen that the fixing of such covering means and the subsequent removal thereof when the wagon reaches the point at which the goods are to be off-loaded, can be extremely time consuming. Moreover, in many cases, the wagon may have to stop before reaching its destination so that the driver can carry out checks to make sure that the covering means remains firmly attached. In accordance with an embodiment of the invention, it is proposed to provide a cover arrangement for the whole of the material being transported on the wagon. Such covering arrangement would comprise means for enveloping the load to be transported, such means itself being inflatable and being provided with one or more streamlining devices in accordance with the invention at the front and/or rear end thereof. In a particularly preferred arrangement, the covering arrangement would be in the form of a large inflatable bag which would preferably be in two halves and sealable to join said halves by the provision of a zip or the like securing means. Each half of the bag could be attached to each of the drop down sides of a flat bed wagon, although it would be possible for other means for securing the end of the bag to the wagon.

There will now be described a preferred arrangement of a combined cover and streamlining device in accordance with the invention, as well as the method of use thereof for transporting palletized goods. A flat bed wagon is provided with an inflatable cover bag being of selected size so that same may cover palletized material of selected height. In the presently described preferred embodiment, the bag is in two halves, one end of each half being attached to the drop down side of the flat bed wagon and the other ends thereof being securable together by means of a zip arrangement. When not in use, the bag in its deflated form would lay on the floor of the wagon. When the wagon reaches its loading point, the zip arrangement is undone and the sides of the wagon are dropped down. At the same time, each half of the bag is also dropped down. The wagon is then loaded with palletized material to the desired height and thereafter the sides are lifted up and secured to the wagon body and the halves of the bag then are placed around and over the palletized load and secured together by use of the zip. The bag, as well as the streamlining devices attached to the front and rear thereof, are then inflated utilising a reversible air pump or alternatively by utilising the existing air supply of the wagon. The bag itself will not be inflated to the same degree as the bulbous streamlining devices in accordance with the invention but the degree of inflation will be such as to provide the desired rigidity and strength for the cover arrangement. The vehicle is now ready to transport the palletized material to its destination, the load being securely covered and the streamlining devices improving the aerodynamic characteristics of the wagon. When the wagon reaches its destination, the bag and associated streamlining devices are deflated, the zip arrangement is undone and the sides of the wagon, together with the respective halves of the cover bag are dropped down. The palletized materials can then be removed from the bed of the wagon without contacting the cover bag. After unloading, the sides are then lifted up and secured to the wagon bed and the cover bag is then neatly arranged on the bed of the wagon, since such will not be needed when the flat bed wagon is returning empty.

It will thus be seen that the just described embodiment is of particular importance when transporting palletized goods on a flat bed wagon and includes the provision of appropriate cover arrangements for the goods to be transported, as well as the provision of streamlining devices in accordance with the invention for improving the aerodynamic characteristics of the wagon.

I claim:

1. A streamlining device for improving aerodynamic characteristics of land vehicles comprising a preshaped flexible outer sheath adapted to be secured to the vehicle, said sheath including a contiguous skirt portion, said skirt portion being affixed to the sheath along an edge thereof, anchoring means including at least one track member mounted to said vehicle with an opposite edge of said skirt portion being secured to said anchoring means, at least one inflatable sack member underlying said sheath, valve means for introducing a substance for expanding the sack and for concurrently extending the outer sheath to a predetermined bulbous shape.

2. A streamlining device as claimed in claim 1 further including a plurality of inflatable sack members, each of said sack members having independent inflation pressures.

3. A streamlining device as claimed in claim 1 wherein the inflatable sack member is fabricated from an elastic material.

4. A streamlining device as claimed in claim 3 wherein the substance introduced to expand the sack is lightweight particulates.

5. A streamlining device as claimed in claim 4 wherein the particulates are granulated polystyrene.

6. A streamlining device as claimed in claim 3 wherein the sack member is inflated with a gaseous substance.

7. A streamlining device as claimed in claim 1 further including ligature means attached to the opposite edge of said skirt portion for providing removable securement to said track member.

8. A streamlining device as claimed in claim 1 further including adjustment means for varying the length of said skirt portion and the corresponding positioning of said sheath to conform with vehicle size and load dimensions.

9. A streamlining device as claimed in claim 3 wherein the outer sheath is comprised of a nonelastic material.

* * * * *